(12) United States Patent
Posset et al.

(10) Patent No.: US 8,137,452 B2
(45) Date of Patent: Mar. 20, 2012

(54) EASY-TO-CLEAN, MECHANICALLY STABLE COATING COMPOSITION FOR METALLIC SURFACES AND PROCESS FOR COATING A SUBSTRATE USING SAID COMPOSITION

(75) Inventors: Uwe Posset, Cadolzburg (DE); Gerhard Schottner, Heilsbronn (DE); Daniel Ford, Ypsilanti, MI (US); Evelyn Deliso, Ann Arbor, MI (US)

(73) Assignees: Masco Corporation, Taylor, MI (US); Fraunhofer-Gesellschaft zur Foerderung der angewandten Forscung e.V. (DE)

( * ) Notice: Subject to any disclaimer, the term of this patent is extended or adjusted under 35 U.S.C. 154(b) by 744 days.

(21) Appl. No.: 12/097,902

(22) PCT Filed: Dec. 23, 2005

(86) PCT No.: PCT/EP2005/014011
§ 371 (c)(1),
(2), (4) Date: Sep. 30, 2008

(87) PCT Pub. No.: WO2007/073756
PCT Pub. Date: Jul. 5, 2007

(65) Prior Publication Data
US 2009/0181175 A1 Jul. 16, 2009

(51) Int. Cl.
*C09D 183/00* (2006.01)
(52) U.S. Cl. ......... 106/287.11; 106/287.13; 106/287.14; 106/287.15
(58) Field of Classification Search ............. 106/287.11, 106/287.13, 287.14, 287.15
See application file for complete search history.

(56) References Cited

U.S. PATENT DOCUMENTS

| | | | |
|---|---|---|---|
| 4,051,161 A * | 9/1977 | Proskow | 556/436 |
| 4,167,537 A | 9/1979 | Taniyama et al. | |
| 4,241,116 A | 12/1980 | Inoue et al. | |
| 4,490,495 A | 12/1984 | Weber | |
| 4,732,787 A * | 3/1988 | Vantillard et al. | 427/386 |
| 5,644,014 A | 7/1997 | Schmidt et al. | |
| 6,245,833 B1 | 6/2001 | Kang et al. | |
| 6,358,612 B1 | 3/2002 | Bier et al. | |
| 6,534,187 B2 | 3/2003 | Kron et al. | |
| 6,541,563 B2 | 4/2003 | Kron et al. | |
| 6,620,514 B1 * | 9/2003 | Arpac et al. | 428/447 |
| 6,887,367 B2 | 5/2005 | Berg et al. | |
| 2002/0193504 A1 | 12/2002 | Brueck et al. | |
| 2003/0027020 A1 | 2/2003 | Berg et al. | |
| 2003/0139620 A1 | 7/2003 | Yamaguchi et al. | |
| 2004/0028914 A1 | 2/2004 | Yanome | |
| 2004/0081818 A1 | 4/2004 | Baumann et al. | |
| 2004/0186216 A1 | 9/2004 | Satoh et al. | |
| 2006/0204655 A1 * | 9/2006 | Takahashi | 427/180 |
| 2007/0261601 A1 * | 11/2007 | Ikeda et al. | 106/287.12 |

FOREIGN PATENT DOCUMENTS

| | | |
|---|---|---|
| EP | 1389634 | 2/2002 |
| EP | 1300433 A2 | 10/2002 |
| WO | WO0240603 | 5/2002 |

OTHER PUBLICATIONS

Search Report PCT/EP2005/014011.
A. Sabata, WJ Van Ooij and RJ Koch, "The interphase in painted metals pretreated by functional silanes", J. Adhesion Sei. Technol. vol. 7, No. 11, pp. 1153-1170 (1993).
Gerhard Schottner, "Hybrid Sol-Gel-Derived Polymers: Applications of Multifunctional Materials", Chem. Mater. 2001, 13, 3422-3435.

* cited by examiner

*Primary Examiner* — David M Brunsman
(74) *Attorney, Agent, or Firm* — Carlson, Gaskey & Olds, P.C.

(57) ABSTRACT

The present invention is directed to an optically clear coating made from a composition comprising an epoxy-melamine resin. The coating is obtained on a metallic substrate and has a very rigid structure and a unique combination of properties that includes hydrophobicity/easy-to-clean, adhesion to bright chrome, abrasion resistance and chemical resistance. The coating composition comprises (A) a mixture of at least one hydrolysable silane and one hydrolysable metal compound, the compounds of said mixture being partly or fully hydrolyzed and partly or fully condensed, (B) at least one melamine derivative selected from derivatives having formula $(C_3N_3)(NR^4R^5)_3$, and derivatives having formula $(C_3N_3)(NR^4R^5)_{3-p}(NR^4R^6)_p$, wherein $R^4$ and $R^5$ are independently selected from H, hydroxymethylene and alkoxymethylene, with the proviso that at least one of the $R^4$ groups is a hydroxymethylene or alkoxymethylene group, and $R^6$ is $-CH_2-NR^4(C_3N_3)(NR^4R^5)_2$ or $-CH_2-O-CH_2NR^4(C_3N_3)(NR^4R^5)_2$, and p is 1 or 2, and either at least one partially or fully fluorinated, at least partly hydrolyzed and condensed silane compound, this compound being part of the said mixture (A) of hydrolysable silanes, or (C) at least one partially or fully fluorinated organic compound containing at least one group which may bind to hydroxy groups.

19 Claims, No Drawings

EASY-TO-CLEAN, MECHANICALLY STABLE COATING COMPOSITION FOR METALLIC SURFACES AND PROCESS FOR COATING A SUBSTRATE USING SAID COMPOSITION

This application is a United States National Phase application of PCT Application No. PCT/EP2005/014011 filed Dec. 23, 2005.

The present invention relates generally to a new type of a mechanically stable coating for metallic surfaces, and more preferably for chromed or chromium surfaces, comprising a composition of an epoxy-melamine resin. This coating is inter alia suitable for sanitary facilities, for example sanitary fittings or fixtures. Upon application to a metallic substrate, a coating is obtained which has a very rigid structure and has a unique combination of properties that includes hydrophobicity/easy-to-clean, [a] specifically good adhesion to bright chrome, abrasion resistance and superior chemical resistance.

Sanitary fittings and room fixtures, e.g. water taps, shower heads, faucets for bath tubs, towel holders, light switch plates and the like are often made from metals the surface of which is decoratively ennobled using galvanic methods. Frequently, a chromium plating is performed, which results in highly shining or glossing, aesthetically high-class surfaces which are mechanically very stable, chemically inert and rather corrosion resistant. Such water fixtures in the sanitary field are generally in a frequent or every day use and then are always in front of the user. However, surfaces of this type tend to be heavily soiled and spoilt, for example due to the deposition of soap, toothpaste or mineral deposits, e.g. calcium carbonate as a residue of running water. Moreover, the hands of the user will touch such fittings every day, and the resulting finger prints are easily visible thereon, due to sweat from the hands which remains visible as a result of the changed reflection characteristics at this area. For this reason, the fixtures need to be cleaned frequently and regularly. Tenacious depositions of mineral deposits can often be removed only with mechanical scrubbing means, and a point is easily reached beyond which the mechanical stability of the surface is no longer sufficient to withstand this mechanical impact. This results in scratches and other damage to the surface. Subsequently, the surface is even more susceptible to contamination and soiling, and finally, the surface looses its lustre and appears to show wear. This process is accelerated in regions where the water is comparatively hard, resulting in end-user complaints and finally in economic losses.

Easy to clean surface coatings are therefore frequently subject to material and surface technique development. Thus, there is a multiplicity of patents and patent applications which deal which research in this field, for example U.S. Pat. Nos. 5,644,014, and 6,245,833, US Patent Application Nos. 2002/0193504 A1 and US 2004/081818, or PCT Application No. WO 02/40603. However, no acceptable coating has been developed, until now, which can be applied using wet chemical processes, because the adhesion to the metal or chromium surface, respectively, was insufficient, and/or the required mechanical stability could not be maintained over a commercially appreciable time period.

Sol-gel techniques offer the possibility to prepare hybrid inorganic-organic coating systems as, for example, described in Schottner, G., Chem. Mater. 2001, 13, 3422-2435, which exhibit very good adherence to surfaces of glass, or plastics. The systems also adhere to basic metals because and as far as such metals usually comprise OH-groups on their surface. Such coatings have also outstanding scratch and abrasion resistance, when compared to merely organic or thin inorganic coatings. However, durable adhesion to surfaces of passivated or noble metals, e.g. to chromium or chromed surfaces, could not be obtained. To overcome this disadvantage, sometimes only very thin coatings (< 1 µm) were applied. These thin coatings are scarcely visible and barely interact with the metal surface. Accordingly, these thin coatings wear away quickly, resulting in the loss of all beneficial mechanical properties after a short term of use. In U.S. Pat. No. 6,887,367 (the '367 patent"), it has been proposed to pretreat the metallic surface prior to coating by chemically activating said surface using a solution containing surfactants and/or reducing the surface with a reducing agent or direct current and/or physically activating the surface using a sputter method. The thus obtained modification of the metallic surface results in a defined surface condition which is distinguished by the fact that the surface has a higher surface energy and thereby allows better adhesion of the sol-gel systems on the surface. After coating same with a sol-gel coating as mentioned above, the metallic impression of the chromic surfaces and the mechanical stability are substantially maintained. However, the chemistry for the coating described in the '367 patent is limiting such that the coating will have a thickness of less than 1 µm. If one were to make this coating thicker, it would crack because it is very britte. Due to the very thin coating, the anti-staining properties gradually decrease in the course of time and finally disappear altogether, demonstrating the adhering properties of the coating to be not sufficient over time. Moreover, in the reflecting light, depending upon the grade and angle of illumination, diffraction and interference phenomena occur. This is also an effect due to the thinness of the coating which introduces fringe patterns that are a problem. Fringe patterns or interference patterns seen with thin clear optical coatings on a metallic substrate are the result of an interaction with light falling onto the surface and the coating. This optical phenomena is that of a typical Bragg reflector. A Bragg reflector is similar to the fringe patterns seen with an oil-on-water slick on the highway pavement.

EP 1 300 433 discloses coatings made from perfluoropolyether-modified silanes which are described to have good water/oil repellency, parting properties, chemical resistance, lubricity, durability, antifouling properties and fingerprint wipe-off. An antireflection filter is also provided comprising an inorganic antireflection layer including a surface layer in the form of a silicon dioxide-based inorganic layer, and an antifouling layer, preferably of the perfluoropolyether-modified silane, on the surface layer. The antifouling layer has a roll off angle with oleic acid of up to 5 degrees, a change of the roll off angle after solvent washing relative to the roll off angle before solvent washing up to 10%. The coatings are intended for the preparation of display screens and other optical elements. The disadvantages of this technology are similar to those as described above: Only thin coatings can be formed (preferably 1 to 10 nm), the scratch resistance and durability (which is not determined) therefore remaining doubtful and, with high probability, not sufficient. Moreover, this technology requires fluorinated solvents for the preparation of the coatings, which is undesirable, and multilayer systems are required to achieve full performance like for antireflection and/or antisoiling properties.

Coatings of metal substrates (but not chrome) are known from EP 1 389 634 to be preparable using (per)fluorinated silanes together with inorganic, surface modified nanoparticles: The coatings are described to have antisoiling properties and scratch resistance. Fairly low layer thicknesses are achieved (<<1 µm) with this composition, to assure antireflective properties of the film of low refractive index (1.40). The scratch resistance of said coatings is insufficient, and it remains doubtful whether they would adhere to chrome. The curing is achieved by active energy rays or photochemically, which is often unsuitable for coatings in the sanitary field. Finally, the formulation is not water-borne, but solvent based, including fluorinated solvents, and multiple coating steps are needed to achieve full performance.

It is the objective of the present invention to overcome the above mentioned disadvantages and to provide a coating which has excellent adhesion to the metallic substrate to which it has been applied, independent of the kind of surface thereof, as mentioned above, but which adheres specifically well to a chrome or chromed surface and which imparts a very good mechanical stability over a prolonged time period to the object treated therewith. Moreover, it is the objective of the invention to provide a method for coating metal surfaces with a coating having the above mentioned properties, which method at the same time avoids the disadvantage of poor adhesion of the coating to the metal surface.

The invention therefore provides a method for coating a substrate and a sol-gel coating composition to be applied onto a specifically pretreated metallic surface by which the above disadvantages are overcome.

The coating composition of the present invention comprises at least components (A) and (B). (A) is a mixture made of at least the following compounds:

at least one silane having formula (I)

$$(A-R)_m\text{—}SiX_{4-m} \tag{I}$$

and
at least one compound having formula (III)

$$M(Y)_n, \tag{III}$$

wherein A is an organic residue which can react with the alkylol or alkylolether group of an alkylolamine residue to yield an ether linkage, R is selected from optionally substituted alkylene and alkenylene groups, X and Y are independently groups the bonding of which to the silicon or metal atom, respectively, is susceptible to hydrolyzation in the presence of water, M is a metal selected from those of the $3^{rd}$ and $4^{th}$ main group of the periodic table and of metals of the transition metal group which occur in trivalent or tetravalent condition, m is independently 1 or 2 and n is 3 in the case of M being a metal of the $3^{rd}$ main group or a trivalent transition metal and is 4 in the case of M being a metal of the $4^{th}$ main group or a tetravalent transition metal, the compounds of said mixture being partially or fully hydrolyzed and partly or fully condensed.

More specifically, in formula (I), A contains an oxirane ring and/or at least one hydroxy group. Preferably, A is a substituted alkyl, alkyloxy, alkenyl or alkenyloxy group having 1 to 6 and more preferably 3 or 4 carbon atoms wherein the substituents consist of or contain at least one oxirane or consist of or contain at least one, preferably two hydroxy group(s). More preferably, A is epoxypropyl, epoxypropyloxy (glycidyl), epoxybutyloxy, hydroxyethyl, hydroxypropyl, 1,2-dihydroxyethyl, 1,2-dihydroxypropyl, 1,3-dihydroxypropyl, 1,2-dihydroxybutyl, 1,3-dihydroxybutyl, 1,4-dihydroxybutyl. The optionally substituted alkylene or alkenylene groups representing R are preferably selected from groups having 1 to 8 carbon atoms and are more preferably selected from ethylene, n- or iso-propylene and n-, iso- and t-butylene. X represents a residue well known in the sol-gel technique to provide hydrolability to the silanes to which they are attached. For example, X may be hydrogen, halogen, alkoxy, acyloxy, alkylcarbony, alkoxycarbonyl or —NR$^2_2$ with R$^2$ being hydrogen or alkyl atom, more preferably chlorine or bromine, or an alkoxy group, for example having 1 to 4 carbon atoms. Most preferably, X is methoxy or ethoxy. m is preferable 1.

Mixture (A) may contain one or more silanes of formula (I). If only one silane of formula (I) is present, A should preferably contain at least one oxirane substituent or at least 2 hydroxy groups, at least in case a fluorinated compound having formula (VI) as defined below is part of the coating composition. If more than one silane of formula (I) is present, in this case, at least one of them should preferably contain at least one oxirane substituent or at least 2 hydroxy groups.

M of formula (III) is preferably selected from the group consisting of Al, Zr and Ti. Y may have the same meaning as defined for X above. Moreover, one or more radicals Y may be replaced by a chelating ligand well known in the art of organometallic chemistry. Further, one or more radicals may be replaced by an —OM(Y)$_{n-1}$ group or an oligomer derived therefrom. Y may also be one "dent" of a complexing inorganic or organic acid or its anion.

The coating composition further comprises at least one partially or fully fluorinated, at least partly hydrolyzed and condensed silane compound or at least one partially or fully fluorinated organic compound containing at least one group which may bind to hydroxy groups, or a mixture of both.

If this compound is a silane compound, it will be selected from compounds having formula (IV):

$$R^1_m SiX_{4-m}, \tag{IV}$$

wherein R$^1$ is a partly or fully fluorinated alkyl group preferably having 4 to 24 carbon atoms, and X and m is defined as for the silane of formula (I) above.

More preferably, R$^1$ is an alkyl group having at least 5 and preferably 6 to 10 partly or fully fluorinated carbon atoms at its end remote from the bond to the silicon atom. Even more preferably, it further contains 1 to 3 CH$_2$ groups between said remote end and the bond to the silicon atom. X is more preferable an alkoxy group and most preferable methoxy or ethoxy. m is preferable 1.

If at least one partially or fully fluorinated silane compound having formula (IV) is present, it will preferably be part of the mixture (A).

In order to obtain mixture (A), the at least one silane having formula (I), the at least one compound having formula (III), and the at least one silane having formula (IV), the latter if present, are partially or fully hydrolyzed and condensed. This may be performed by separately dissolving them in a suitable solvent, adding a sufficient amount of water and, if required or desired, a condensation catalyst, and then mixing the resulting solutions (sols). Alternatively, hydrolyzation of the silane (s) having formula (I) and optionally having formula (IV) and of the compound(s) having formula (III) may take place in one single solution. For this purpose, the compound(s) having formula (III) may be dissolved in a suitable solvent to which a stabilizing or chelating agent is given, in order to avoid that hydrolyzation of the compound(s) having formula (III) will take place before the silanes have been added, because the metal compound(s) of formula (III) usually hydrolyze much faster than silanes, if carrying identical or comparable residues X and Y, respectively. The silane(s) of formula (I) and, if present, of formula (IV) is/are then added, either directly or dissolved in another or the same solvent as that for the compound(s) of formula (III). Subsequently, a suitable amount of water and, if required or desired, a condensation catalyst is given to the mixture, in order to initiate hydrolysis of the compounds present therein.

The solvents useful for dissolving the above mentioned compounds having formula (III), (IV) and/or (I) are known to a person skilled in the art. For example, they may be selected from the group consisting of alcohols preferably having 1 to 8 carbon atoms and alkoxyated alcohols of formula CH$_3$—

$(CH_2)_o$—O—$(CH_2)_p$OH, wherein o is an integer of preferably 1 to 8 and p is an integer of preferably 1 to 6. The stabilizing or chelating agent may for example be selected from alkyl acylalcanoates or diketonates, more preferably from methyl or ethyl esters of acylacetic acids and may for example be acetylacetic acid or acetylacetone.

In a preferred embodiment of the invention, the mixture (A) additionally contains at least one silane having formula (II)

$$Ar_m\text{—}SiX_{4-m},$$

in partly or fully hydrolyzed and condensed form, wherein Ar is an optionally substituted aryl or arylalkylene group preferably having 6 to 18 carbon atoms, and X and m are defined as for formula (I) above. More preferably, Ar is an optionally substituted phenyl or phenylalkylene, the alkylene group having 1 to 3 carbon atoms. X is preferably an alkoxy group and most preferably methoxy or ethoxy. Silanes having formula (II) will impart additional hydrophobicity to the coating composition. Since this composition further contains at least one fluorinated compound, resulting in an increasing hydrophobicity as well, the addition of silanes having formula (II) will be optional at the discretion of the skilled person, depending on the amount of fluorinated groups present in the coating composition and on the level of hydrophobicity to be obtained.

The silane having formula (II) may be added to the solution by which mixture (A) is obtained as defined above, for example together with the silane of formula (I), either directly or dissolved in a suitable solvent. Such solvents are known in the art.

As a condensation catalyst, any catalyst known in the art can be used. E.g., amine catalyst are often used in silicon sol gel technology. More preferably, the catalyst is also a silane compound, having the following formula (V):

$$(NHR^2\text{—}R^3)_m SiX_{4-m} \quad (V)$$

wherein $R^2$ is hydrogen or an optionally substituted alkyl having preferably 1 to 6 carbon atoms, $R^3$ is an optionally substituted alkylene group preferably having 1 to 8 carbon atoms, and X and m are as defined for the silane of formula (I). Most preferably, m is 1, and/or X is methoxy or ethoxy, and/or $R^3$ is methylene, ethylene, propylene or n- or isobutylene. As will be obvious for a skilled person, this silane catalyst will not only act catalytically, but will also be integrated into the at least partly hydrolyzed and condensed network of silane(s) and metal compound(s).

Water will be added to this mixture in an amount sufficient to at least partially hydrolyze and therefore condense the different silane(s) and metal compound(s). Mixture (A) can then be stored, preferably under cooling, for days or even months, if required.

In order to prepare the sol-gel coating composition of the invention, mixture (A) is combined with at least one compound (B) which is an optionally alkoxylated alkylolamine derivative of melamine or a low polymerized melamine resin, and optionally with at least one partially or fully fluorinated organic compound (C), if no silane of formula (IV) is present or if an additional organic fluorinated compound is desired to be present in the coating composition.

The optionally alkoxylated alkylolamine derivative of melamine is selected from derivatives having formula (VI)

$$(C_3N_3)(NR^4R^5)_3, \quad (VI)$$

wherein $R^4$ and $R^5$ are independently selected from H, hydroxymethylene and alkoxymethylene, with the proviso that at least one of the $R^4$ groups present in the molecule of formula (VI) is a hydroxymethylene or alkoxymethylene group, wherein the alkoxy residue therein is preferably selected from methoxy, ethoxy; n- or isopropoxy and n-, iso- or t-butoxy. More preferable, 2 to 6 groups of $R^4$ and $R^5$, even more preferably 4 to 6 and most preferable, 5 groups are such hydroxymethylene or alkoxymethylene groups.

Those $R^4$ groups being alkoxymethylene are preferably methoxymethylene groups. Examples for compounds of formula (VI) are depicted in scheme 1.

The low polymerized melamine resin is selected from those having formula (VII)

$$(C_3N_3)(NR^4R^5)_{3-p}(NR^4R^6)_p, \quad (VII)$$

wherein $R^4$ and $R^5$ are defined as for formula (VI), and $R^6$ is —$CH_2$—$NR^4(C_3N_3)(NR^4R^5)_2$ or —$CH_2$—O—$CH_2NR^4(C_3N_3)(NR^4R^5)_2$, and p is 1 or 2. Preferably, more than 2 groups $R^4$ and $R^5$ are hydroxymethylene or alkoxymethylene groups.

Scheme 1: Molecular formulas of melamine resins

R 735

R = Me,
R' = H or $CH_2OH$

VMF 3950

R = Me

VMF 3924

R = Me, n-Bu

Compound (C) is a compound which may be bound to free hydroxy groups. Consequently, it should contain at least one —COZ residue, wherein Z is OH, Cl, an anhydride group or $NHR^2$ wherein $R^2$ is selected from alkyl having 1 to 6 carbon atoms. Preferably, it contains at least one partly or fully fluorinated alkyl group. More preferably, compound (C) is of formula (VIII)

$$R^1\text{—}COZ \quad (VIII)$$

wherein $R^1$ is defined as for formula (IV) above.

The coating composition will normally be optically clear.

Before the coating composition as defined above is applied to a metal surface, for example a galvanically chrome-plated surface, this metal surface is pretreated, according to the present invention. The pretreating method may be one of those methods as disclosed in U.S. Pat. No. 6,887,367, for example a chemical activation of the surface using a solution containing surfactants, a chemical activation of the surface using a reducing agent or direct current or a physical activation using a sputter method, or a combination thereof. By this pretreatment, the wetting characteristics of the metallic surface are improved (the wetting angle of water is substantially decreased). Moreover, the pretreatment implies a high surface energy to the metallic surface. In summary, the adhesion of the coating composition as defined above to be subsequently applied will substantially be improved.

It has been found most convenient to use one of the following methods: The surfaces of the article which are to be coated are contacted with an alkaline silicate solution ("waterglass"). For example, the article is immersed is such a solution. Preferably, zinc granules are present in said silicate solution. The contact time is preferably between 1 minute and one hour, and the temperature of the solution is preferably in the range of 50° C. to 85° C. After removing the article or its surface from the solution, the metallic surface to be coated is spray coating e.g. HVLP (high volume low pressure coating which is a type of air spray gun), rotary bell atomization spray gun, immersing the surface into a bath of the coating composition, or spin coating. The application may be performed in one step or by applying more than one layer, each layer preferably being at least partially dried before application of the next one. The coating can be applied to a final thickness of about 1 to 15 μm, more preferably of 2 to 8 μm. Finally, the coating is dried or cured on the metallic surface at temperatures between about 150° C. and 200° C., preferably at a temperature of about 180° C. By providing thermal curing or curing by drying, no requirements for photoinitiator chemistry are necessary.

Upon drying or curing the coating composition on the metallic surface, free epoxy or hydroxy groups in the at least partly hydrolyzed and condensed mixture (A) will react with alkoxy groups of the alkylolamine residues bound to the melamine core of compound (B). This may be exemplified through the following scheme 2, wherein a silane of formula (I) is depicted which will undergo hydrolysis and condensation reactions (addition of H$^+$ in the presence of water, loss of CH$_3$OH, as shown below the arrow) and reacts with the melamine derivative named VMF3950, having 5 methoxy groups.

Scheme 2:

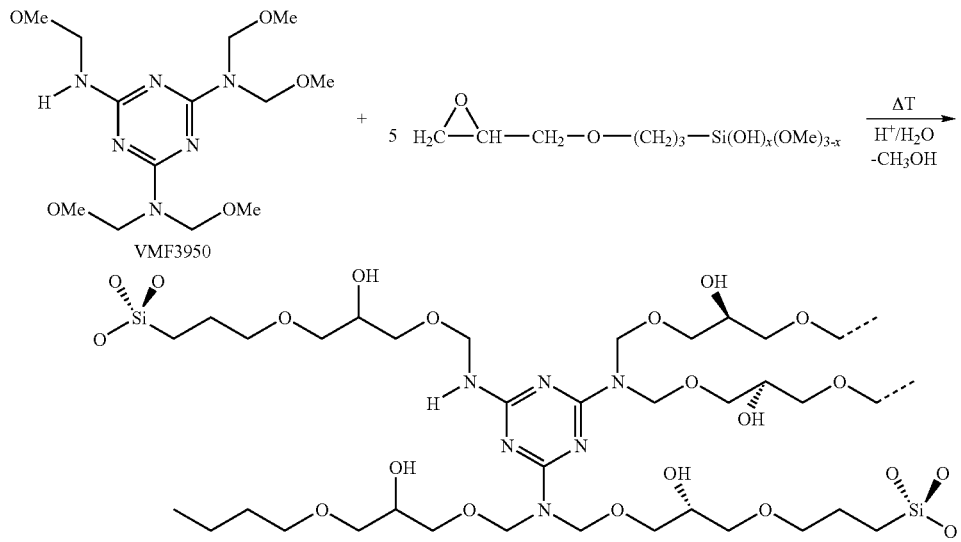

rinsed with demineralized water and optionally cleaned with a wet towel in order to remove adhering silicate sol before it is dried, for example in an air flow or using compressed air.

Without wishing to be bound to any theory, the inventors believe that by this treatment, a transition layer is formed between the metallic surface and the sol-gel coating. The interface between the metallic surface and the sodium silicate layer provides a mechanical bond. The sodium silicate solution is able to penetrate into the microstructure of the e.g. electroplated chrome surface, thereby firming the mechanical bond. The sodium silicate layer presents to the sol-gel a hydroxylated surface that allows for direct bonding of the hydroxyls contained in the sol to the sodium silicate layer. In this way, good adhesion is obtained.

The coating composition can then be applied to the pretreated metallic surface, using one of the conventional techniques known in the art. Examples for such techniques are It should be appreciated that incorporation of a metal compound having formula (II) and silane compound(s) having formula (II) and/or (IV) into the network has been omitted in the scheme for the sake of clarity. Moreover, it should be appreciated that in case the presence of a compound (C) having formula (VI) is desired, this compound may be bound to free hydroxy groups within the network, which, however, will only be present in case at least one silane having formula (I) has been used for mixture (A) which comprises a group A-R— wherein A contains either an epoxy group or more than one hydroxy group.

The aromatic C$_3$N$_3$ melamine ring core is a very rigid structure. As will be evident for a skilled person, this rigidity together with a very dense network (up to 6 connections between one melamine ring and silane compounds and/or metal compound possible) will result in a coating which is mechanically very stable and therefore superior to prior art sol-gel coating compositions. By properly selecting the number of the oxyalkyl residues $R^4$, $R^5$ in the melamine compound within the scope of the invention as defined above, this stability may be finely adapted as required. Further, the cross-linking of the components of the inventive coating will result in a heteropolymerized three dimensional network. This tight cross-linked structure of the coating means that chemicals that are placed on the top surface of the coating cannot penetrate through the coating to the substrate. This behaviour provides the chemical resistance as outlined above.

On the other side, the inventive coating, after application and processing still has some ductility that comes from the organic portion of the inorganic-organic hybrid structure. This implies the possibility to provide the coating with an increased thickness on the substrate surface, compared to prior art (see discussion of U.S. Pat. No. 6,877,367 above). The coating of the present invention can be applied to the substrate, for example, in a thickness of 1 to 25 μm, preferably of 2 to 10, more preferably of 3 to 10 and even more preferably of 4 to 8 μm. As the coating thickness is increased above critical thickness, fringe patterns are no longer visible to the human eye. In addition, an excellent abrasion resistance is obtained.

When applied to a metallic surface which is pretreated as defined above, a very well adhering, highly cured and abrasion resistant coating is therefore obtained which is easy to clean. This coating is specifically, but not exclusively, useful on chromed or chromium, preferably shining surfaces. It is, however, also useful on matt or matt shining surfaces and/or on metal surfaces having a texture. The scale of the texture can be short or long range, patterned or unpatterned.

The following non-limiting examples shall illustrate the invention further.

EXAMPLE 1

6.51 g of ethyl acetoacetate was added to 12.32 g of aluminum sec-butoxide in 13,76 butoxyethanol. After stirring for a short time period, 38.41 g of (3-glycidoxypropyl)-trimethoxysilane, 4.96 g of phenyltrimethoxysilane, 2.77 g of 3-aminopropyl-triethoxysilane, and 1.53 g of (heptadecafluoro-1,1,2,2-tetrahydrodecyl)triethoxysilane were then added to the mixture. After additional stirring, 16.06 g deionized water were added under further stirring in small increments. After about one hour, the mixture has hydrolyzed and can be stored for a prolonged time period, if necessary or desired, under cooling. Prior to application, 8.9 g butoxyethanol and 8.3 g Maprenal 3950/90 IB (methoxylated pentamethylolmelamine) were added to 41.6 g of the hydrolyzed mixture, and the resulting mixture was stirred until completely mixed.

EXAMPLE 2

A typical 3 inch×8 inch electroplated chrome panel was immersed in 2500 g of sodium silicate solution. The electroplated chrome panel and the sodium silicate solution were in contact with 150 g Zinc shot in the bottom of the beaker. The pre-treatment time was 5 minutes at 70° C. The panel was rinsed with deionized water, whereafter adherent sodium silicate agglomerations were wiped away with a wet paper towel. The panel was then dried with an air knife, making it ready for coating application.

EXAMPLE 3

The mixture obtained according to Example 1 was applied to the pretreated chrome panel of example 2 by spraying with an HVLP gun. The coating was then cured by heating in a forced air convection oven for 2 hours at 180° C.

An optically clear coating is obtained on the panel which has a unique combination of properties that includes hydrophobicity/easy-to-clean, adhesion to bright chrome, abrasion resistance, and chemical resistance.

The coated chrome panel of example 3 was inspected and found to have the properties depicted in Table 1:

TABLE 1

| | |
|---|---|
| layer thickness | 3-5 μm |
| solvent-resistance (methylethyl ketone) | 200 strokes (no visible effect) |
| CASS Test (200 hrs) (1) | stable (no significant change in contact angle with water) |
| mandrel bend test (3 mm) | Crack formation, but no delamination |
| Contact angle with water | 100° |
| Roll-off angle with water | 12° |
| Cross hatch adhesion characteristic (DIN* 53151) | Gt 0 |
| *German Industrial Norm | |
| Adhesion after water immersion (240 h at 38° C.) | Gt 0 |
| Pencil hardness | 6 H (scratches) 9 H (deformation) |
| Microhardness (nanoindentor) | 604-627 MPa |
| Chemical Resistance | 6 N acetic acid (no effect) phosphoric acid (42.5%, no effect) ammonium hydroxide (6 N, no effect) methanol (no effect) trixon X, tenside (no effect) |
| Modulus of elasticity | 4.23-4.35 GPa |

(1) The conditions of the CASS test are specified by (US) ASTM B 368. The CASS test is a copper-accelerated acetic acid salt spray test. The salt fog created for this test is created from a solution of 5% sodium chloride in ASTM D1193 Type IV water with 0.25 g of reagent grade copper chloride ($CuCl_2 \times 2H_2O$) per liter of solution. The solution is delivered to the chamber as a fog at a temperature of 60° to 65° at a pressure of 0.08 to 0.12 MPa. The pH of this solution is adjusted to a pH range of 3.1 to 3.3 as measured on a sample of the collected spray. The chamber temperature is held at 49±1° C.

EXAMPLE 4

The coating obtained according to Example 3 was tested for its abrasion resistance. The coated electroplated chrome test panel was immersed in de-ionized water and scrubbed with a 3M brand delicate-duty Scotch Brite spone (UPC 21200 00002) with no load placed on the scrub sponge. The test panel was scrubbed for 10.000 back-and-forth scrub cycles using a Gardco Model D12VFI scrub tester. No visual marring damage was observed on the panel after 10.000 scrub cycles.

COMPARATIVE EXAMPLE

A clear hydrophobic coating on a galvanically coated chrome panel with a thickness of less than one μm was tested. Optical fringe patterns were visible on the coating. The contact angle with water was measured to be between 108° and 112°. During aggressive scrubbing tests, the coating was removed. Chemical resistance to caustic chemicals was poor. Chemical resistance to hydrochloric acid was good.

The invention claimed is:
1. A coating composition, comprising
(A) a mixture of at least the following components:
at least one silane having formula (I)

$$(A-R)_m SiX_{4-m} \quad (I)$$

and at least one compound having formula (III)

$$M(Y)_n, \quad (III)$$

wherein A is an organic residue which can react with an alkylol or an alkylolether group of an alkylolamine residue to yield an ether linkage, R is selected from an optionally substituted alkylene and alkenylene groups, X and Y are independent groups the bonding of which to the $S_i$ or M atom, respectively, is susceptible to hydrolyzation in the presence of water, the M is a metal selected from those of the $3^{rd}$ and $4^{th}$ main group of the periodic table and of metals of the transition metal group which occur in trivalent or tetravalent condition, m is independently 1 or 2 and n is 3 in the case of M being a metal of the $3^{rd}$ main group or a trivalent transition metal and is 4 in the case of M being a metal of the $4^{th}$ main group or a tetravalent transition metal, the compounds of said mixture being partially or fully hydrolyzed and partly or fully condensed, (B) at least one of an alkylolamine derivative of melamine selected from derivatives having formula (VI)

$$(C_3N_3)(NR^4R^5)_3, \quad (VI)$$

wherein $R^4$ and $R^5$ are independently selected from H, hydroxymethylene and alkoxymethylene, with the proviso that at least one of the $R^4$ groups present in the molecule of formula (VI) is a hydroxymethylene or alkoxymethylene group, or derivatives having formula (VII)

$$(C_3N_3)(NR^4R^5)_{3-p}(NR^4R^6)_p, \quad (VII)$$

wherein $R^4$ and $R^5$ are defined as for formula (VI), and $R^6$ is —$CH_2$—$NR^4(C_3N_3)(NR^4R^5)_2$ or —$CH_2$—O—$CH_2$—$NR^4(C_3N_3)(NR^4R^5)_2$, and p is 1 or 2;

and at least one of the group consisting of:

partially or fully fluorinated, at least partly hydrolyzed and condensed silane compounds having formula (IV):

$$R^1{}_m SiX_{4-m}, \quad (IV)$$

wherein $R^1$ is a partly or fully fluorinated alkyl group having at least 5 partly or fully fluorinated carbon atoms, and X and m are defined as for the silane of formula (I) above, the silane compound(s) having formula (IV) being part of mixture (A), and partially or fully fluorinated organic compounds (C) including at least one group which may bind to hydroxy groups.

2. The coating composition as claimed in claim 1, including said partially or fully fluorinated, at least partly hydrolyzed and condensed silane compounds, wherein $R^1$ has 6 to 10 partly or fully fluorinated carbon atoms.

3. The coating composition as claimed in claim 1, including said partially or fully fluorinated, at least partly hydrolyzed and condensed silane compounds, wherein $R^1$ has 6 to 10 partly or fully fluorinated carbon atoms at a remote end from the bond with Si.

4. The coating composition as claimed in claim 3, wherein $R^1$ has 1 to 3 $CH_2$ groups between said remote end and the bond with Si.

5. The coating composition as claimed in claim 1, including said partially or fully fluorinated organic compounds (C), wherein (C) is formula (VIII):

$$R^1—COZ \quad (VIII)$$

wherein Z is selected from a group consisting of OH, Cl, an anhydride group and $NHR^2$, where $R^2$ is an alkyl group.

6. The coating composition as claimed in claim 5, including said $NHR^2$, wherein $R^2$ has from 1 to 6 carbon atoms.

7. The coating composition as claimed in claim 1, wherein m in formula (I) is 1.

8. The coating composition as claimed in claim 1, further comprising at least one silane having formula (II)

$$Ar_m—SiX_{4-m}, \quad (II)$$

in partially or fully hydrolyzed and partially or fully condensed form, wherein Ar is an optionally substituted aryl or arylalkylene group, and X and m are defined as for formula (I) in claim 1, wherein the silane having formula (II) is part of mixture (A).

9. The coating composition of claim 8, wherein m in formula (II) is 1.

10. The coating composition of claim 8, wherein X in formulae (I), (II) and/or (IV) is independently selected from halogen atoms or alkoxy groups having 1 to 4 carbon atoms.

11. The coating composition of claim 1, wherein at least one or the only partially or fully fluorinated organic compound is of formula (IV) as defined in claim 1.

12. The coating composition of claim 1, wherein Y in formula (III) is independently selected from halogen atoms or alkoxy groups having 1 to 4 carbon atoms.

13. The coating composition as claimed in claim 1, wherein A in formula (I) is a group which is or contains a glycidyl residue.

14. The coating composition as claimed in claim 13, wherein A-R in the silane of formula (I) is a glycidyloxyalkyl residue.

15. The coating composition of claim 1, wherein the mixture as defined in (A) additionally comprises a condensation catalyst.

16. The coating composition of claim 15, wherein the condensation catalyst is an aminoalkyltrialkoxysilane.

17. The coating composition of claim 1, further comprising a solvent.

18. The coating composition as claimed in claim 17, wherein at least a portion of the solvent is selected from the group consisting of alcohols having 1 to 8 carbon atoms and alkoxyalcohols of formula $CH_3—(CH_2)_o—O—(CH_2)_p OH$, wherein o is an integer of 1 to 8 and p is an integer of 1 to 6.

19. A coating composition, comprising (A) a mixture of at least the following components:

at least one silane having formula (I)

$$(A-R)_m SiX_{4-m} \quad (I)$$

and at least one compound having formula (III)

$$M(Y)_n, \quad (III)$$

wherein A is an organic residue which can react with an alkylol or an alkylolether group of an alkylolamine residue to yield an ether linkage, R is selected from an optionally substituted alkylene and alkenylene groups, X and Y are independent groups the bonding of which to the $S_i$ or M atom, respectively, is susceptible to hydrolyzation in the presence of water, the M is a metal selected from those of the $3^{rd}$ and $4^{th}$ main group of the periodic table and of metals of the transition metal group which occur in trivalent or tetravalent condition, m is independently 1 or 2 and n is 3 in the case of M being a metal of the $3^{rd}$ main group or a trivalent transition metal and is 4 in the case of M being a metal of the $4^{th}$ main group or a tetravalent transition metal, the compounds of said mixture being partially or fully hydrolyzed and partly or fully condensed, (B) at least one of an alkylolamine derivative of melamine selected from
derivatives having formula (VI)

$$(C_3N_3)(NR^4R^5)_3, \qquad (VI)$$

wherein $R^4$ and $R^5$ are independently selected from H, hydroxymethylene and alkoxymethylene, with the proviso that at least one of the $R^4$ groups present in the molecule of formula (VI) is a hydroxymethylene or alkoxymethylene group, or
derivatives having formula (VII)

$$(C_3N_3)(NR^4R^5)_{3-p}(NR^4R^6)_p, \qquad (VII)$$

wherein $R^4$ and $R^5$ are defined as for formula (VI), and $R^6$ is —$CH_2$—$NR^4(C_3N_3)(NR^4R^5)_2$ or —$CH_2$—O—$CH_2$—$NR^4(C_3N_3)(NR^4R^5)_2$, and p is 1 or 2;

and at least one of the group consisting of:

partially or fully fluorinated, at least partly hydrolyzed and condensed silane compounds having formula (IV):

$$R^1{}_m SiX_{4-m}, \qquad (IV)$$

wherein $R^1$ is a partly or fully fluorinated alkyl group, and X and m are defined as for the silane of formula (I) above, the silane compound(s) having formula (IV) being part of mixture (A), and partially or fully fluorinated organic compounds (C) including at least one group which may bind to hydroxy groups.

* * * * *